United States Patent [19]

Falcone, Jr. et al.

[11] 4,230,496
[45] Oct. 28, 1980

[54] ZINC RICH PAINT VEHICLE

[75] Inventors: James S. Falcone, Jr., Devon; Robert W. Spencer, Wallingford, both of Pa.

[73] Assignee: PQ Corporation, Valley Forge, Pa.

[21] Appl. No.: 944,814

[22] Filed: Sep. 22, 1978

[51] Int. Cl.$^2$ .................................................. C09D 5/10
[52] U.S. Cl. ................................ 106/14.21; 106/1.17; 106/74; 106/84; 106/287.11; 106/287.16
[58] Field of Search ............... 106/14.21, 14.25, 14.33, 106/1.17, 287.13, 287.14, 287.16, 74, 84, 287.11

[56] References Cited

U.S. PATENT DOCUMENTS

| | | | |
|---|---|---|---|
| 3,198,820 | 8/1965 | Pines et al. | 528/39 |
| 3,453,122 | 7/1969 | Weldes et al. | 106/1.17 |

*Primary Examiner*—Lorenzo B. Hayes
*Attorney, Agent, or Firm*—Ernest G. Posner; Stephen Bobb; Fred C. Philpitt

[57] ABSTRACT

Aqueous organic ammonium silicate-alkali metal silicate combination vehicles for zinc-rich, corrosion-resistant paints are improved by the addition of organosilicone-silicate polymers. The improvement is manifested by increased adhesion to poorly prepared metal surfaces and harder paint films.

8 Claims, No Drawings

ZINC RICH PAINT VEHICLE

BACKGROUND OF THE INVENTION

This invention relates to zinc-rich paint coatings. In particular, this invention is an improvement to aqueous organic ammonium silicate-alkali metal silicate zinc-rich paints.

An aqueous vehicle for a self-curing zinc-rich paint is disclosed in U.S. Pat. No. 3,453,122. This vehicle consists of an organic quaternary ammonium silicate, an alkali metal silicate and hydrous magnesium silicate. The organic and alkali metal silicates act together to provide binding action, while the magnesium silicate provides body to the composition. This system is an excellent corrosion-resistant, zinc-rich coating and at the time provided an advance in the art since the pot-life was extended, when compared to prior art silicate coatings. Unfortunately, successful application of this coating system requires meticulous preparation of the metal surface. It must be sand or grit blasted to a white or near white condition to achieve adequate adhesion.

The art involved in inorganic zinc rich coatings was considered in preparing this application and the previously mentioned U.S. Pat. No. 3,543,122 is considered to be the most relevant prior art to the present invention. U.S. Pat. No. 3,198,820 discloses the preparation of organosilicone-silicate polymers. These patents are hereby incorporated in the present application by reference.

SUMMARY OF THE INVENTION

An improved vehicle for zinc-rich paints comprising soluble quaternary organic ammonium silicate, soluble alkali metal silicate, hydrated magnesium silicate and an organosilicone-silicate polymer has been developed. This vehicle when mixed with the requisite zinc powder provides a coating composition which can be applied successfully to metal surfaces that would be inadequately prepared for prior art silicate paints.

THE INVENTION

The organic silicates used in the improved composition of our invention are quaternary ammonium silicates having one to four alkanol groups. We usually prepare such silicates by reacting an alkyl amine or ammonia with an alkylene oxide and a source of colloidal silica. We prefer to react ethylene oxide with an amine or ammonia dissolved in a silica sol. We select the organic ammonium silicate from the group consisting of tetraethanolammonium silicate, methyltriethanolammonium silicate, dimethyldiethanolammonium silicate, trimethylethanolammonium silicate, ethyltriethanolammonium silicate, diethyldiethanolammonium silicate, n-propyltriethanolammonium silicate, and benzyltriethanolammonium silicate. We usually prepare the vehicle with methyltriethanolammonium silicate. These organic silicates contain 5-22.5 moles of $SiO_2$ per mole of quaternary ammonium ion with mole ratios of 7-15 $SiO_2/NR_4$ preferred. These solutions contain 25 to 55% solids.

The soluble alkali metal silicate of our composition is usually a solution although a solid can be used under some circumstances. Sodium silicate solutions with 1.5 to 4.0 moles of $SiO_2$ per mole of $Na_2O$ and 30 to 50% silicate solids are used most frequently. Equivalent potassium and lithium silicates are satisfactory as well.

Our composition requires a thickening agent to provide body to the final composition. Hydrous magnesium silicates, clays, soluble gums and the like are suitable. Almost any thickening agent that is compatible with the alkaline system is suitable but we prefer to use hydrous magnesium silicate.

The organosilicone-silicate polymer of our invention can include carboxyl or phosphonate groups in addition to the silicone and silicate functionalities. These materials that are often called siliconates consist of 10 to 90% of siloxane and 10 to 90% of an alkali metal silicate. Said siloxane group having the general formula of:

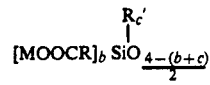

M represents sodium or potassium; R stands for a divalent hydrocarbon; R' represents monovalent hydrocarbon group; b has a value of 1 to 3; c has a value of 0 to 2, and (b+c) has a value of 1 to 3. Details of the preparation of these materials are found in U.S. Pat. No. 3,198,820 which is incorporated by reference. We especially prefer to use siliconates with a general formula of:

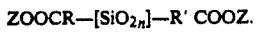

Z represents hydrogen, sodium, or potassium, R and R' are the same or different divalent hydrocarbons and n has a value between 2 and 20. The carboxyl group can be substituted by a phosphonate group.

The vehicle of our invention is prepared as follows. The thickening agent is dispersed in water. The organic ammonium silicate and the alkali metal silicate are combined in the proportions to provide 0.7 to 10 parts by weight (pbw) per pbw of alkali metal silicate. The 2 separate mixtures are combined. Then the polymer is introduced and mixed in thoroughly. Medium to high shear is required to obtain a stable material.

The composition of the vehicle is 30 to 45 pbw of organic ammonium silicate, 10 to 25 pbw of alkali metal silicate solution, 0.2 to 2.5 pbw of a thickening agent, 0.05 to 3.5 pbw of the organosilicone-silicate polymer, and 40 to 55 pbw of water. The silica content of the vehicle should be 15 to 24% by weight.

This vehicle is stored until needed. Just prior to use, the zinc-rich coating composition is prepared by dispersing 6 to 20 pbw of zinc powder per pbw of $SiO_2$ in the vehicle.

We have found that our improved coating composition adheres well to most metal surfaces, even those that would be unsuitable for prior art silicate paints. The prior art coatings have very good adhesion to metal surfaces that have been sand blasted to a white metal condition. The coatings of our composition also adheres extremely well to these surfaces. In addition, the vehicle of our invention forms tightly adhereing and hard coating on metal surfaces with rust, mill scale after simple cleaning or wire brushing.

EXAMPLES

The following Examples illustrate certain embodiments of our invention. These Examples should not be construed as disclosing the scope and limits of our invention. The scope of our invention are fully set forth in the disclosure and the claims. The test methods used in these Examples were the Hoffman, pencil and knife scratch tests and a tensile test.

TEST METHODS

There is a close relationship between hardness and adhesion testing. The scratch tests measure both hardness and adhesion. For the latter property we look for traces of paint left in the scratched area, and notice whether the edges of the scratched area are sharp and clean (poor adhesion), or whether they are tapered from the undisturbed coating to the center of the scratch. With good adhesion, traces of paint will be left in the scratched area.

The tensile test is the purest measure of adhesion, as long as the paint breaks cleanly away from the substrate. In a few cases "disbonding" of the coating occurred; part of the paint was left on the test panel and part came off on the plug.

TENSILE TEST

For the tensile test, plugs made from 0.50" diam. aluminum rod were glued to the 1.5"×12" strips using Eastman 910 adhesive "SUPER-GLUE". The plugs were glued to the coatings 24 hours after the paint was applied; they were usually pulled off using the Tensile Tester 24 hours later. Results are given in lbs/in$^2$. The tester was the Instron Model 1130 Universal Testing Instrument, with a 100 lb. load cell.

For good reproducibility in this test, it is important to have flat gluing faces which are exactly 90° to the long dimension of the plug.

THE KNIFE SCRATCH TEST

In the test, a penknife used at an angle of approximately 30° to the panel to scratch the coating. The following ratings were assigned by a single tester.
  a. no adhesion, usually no coating on substrate;
  b. easily flaked off; can be scratched off with thumbnail;
  c. easily flaked off with knife blade leaving sharp edges around scrape;
  d. fairly easy to scrape off with knife; sharp edges;
  e. harder to scrape off with knife; edges not as sharp;
  f. harder to scrape off; beveled edges from undisturbed to scraped areas;
  g. paint left in grooves in scraped area;
  h. hard to scrape paint off; paint left in scraped area; and
  i. very hard to scrape paint to reach substrate.

THE PENCIL SCRATCH TEST (Disbonding Method)

Pencils of various hardness with squared leads are used at a 45° angle to the coated panel. The lead is pushed into the coating which is considered to fail if the coating chips, flakes, scales or shears from the substrate while the pencil point does not break. The hardness of the pencil is given as the result. The hardest lead being 9H and the softest 6B.

THE HOFFMAN SCRATCH TEST

The Hoffman Scratch Test is a low carriage with a weighted (lever at one end). The scratching tool is a sharp edged, hardened steel cylinder with its axis at an angle of 45° to the plane of the film. This cylinder is attached to the lever arm, and the load is varied by varying the position of the weight on the lever.

The tester is supported on wheels so that it can be moved upon the test specimen. Arrange the instrument so that all four of its wheels rest on the test panel and the scratch tool will follow, not precede, the carriage of the instrument as it is drawn over the test specimen. Place the standard rider at the specified weight on the beam. Draw the scratch tool across the test coating, while maintaining a sufficient amount of downward pressure, with the thumb and two fingers upon the platform directly over the pair of wheels next to the scratching tool, to overcome any tendency of the beam and scratch tool to lift these wheels from the surface of the test coating. Repeat this operation increasing the weight on the beam with each new scratch until the scratching tool cuts through the test coating to the substrate.

TEST PANELS

For the scratch tests, Q-PANELS® were used. These are 4"×8"×.059" cold rolled steel panels. The two sides have slightly different surfaces, being very smooth on one side, and lightly roughened on the other. Both of these panels are bare, as received; they will rust quickly if not protected.

The tensile-pull test strips, 1.5"×12"×5/64", were cut from hot rolled steel having the mill scale still attached. Mill scale is the black scale-like coating of oxides, especially $Fe_3O_4$, which is formed on the surface of iron in the hot rolling process. To some extent it prevents further rusting.

SURFACES

The Steel Structures Painting Council has listed 10 degrees of surface preparation. These are summarized as:

| SURFACE PREPARATION STANDARDS HAND AND BLAST CLEANING STANDARDS COMPARISON | |
| --- | --- |
| System | Steel Structures Painting Council (SSPC) |
| Solvent Clean | SSPC-SP-1 |
| Hand Tool Clean | SSPC-SP-2 |
| Power Tool Clean | SSPC-SP-3 |
| Flame Clean (New Steel) | SSPC-SP-4 |
| White Metal Blast | SSPC-SP-5 |
| Commercial Blast | SSPC-SP-6 |
| Brush Off Blast | SSPC-SP-7 |
| Pickling | SSPC-SP-8 |
| Weather and Blast | SSPC-SP-9 |
| Near White Blast | SSPC-SP-10 |

The SSPC-SP-5 White Metal Blast or SSPC-SP-10, Near White Blast are required for the prior art silicate zinc rich paints. These are obtained by blasting the panels with POLY-GRIT® mineral abrasive grit. In addition to cleaning the surfaces of rust, oil, mill scale, etc., this treatment leaves a roughened surface with a valley-to-peak profile of about 1.5-2 mils. SSPC-SP-3, power tool cleaning was simulated by wire brushing the strips. Other inadequately-prepared surfaces were done as follows:
  (a) panels with either bare or mill-scale surfaces were placed in the salt fog cabinet and allowed to rust;
  (b) clean or mill-scale surfaces were coated with transmission oil, which was then wiped off as completely as possible. Actually, this treatment removed much caked oil and dirt from the strips; and (c) bare or mill scale surfaces were cleaned with detergent, rinsed and dried. This left an oil-free, smooth or mill scale surface.

For the tensile test samples, 3 strips were used with the mill scale left on. In one case, the strip was allowed to rust, in the second, the oil coating was applied, and in the third, the panel was surfactant cleaned. The mill scale was removed from 2 strips; one was allowed to rust and the other was oiled. The sixth was grit-blasted.

The 4"×8" panels were prepared with 4 surfaces. One panel was used, and one-half of each side was given a different preparation. One area was grit-blasted to a near-white or white metal surface. Another surface was allowed to rust. A third area, smooth and rust-free, was oiled and the fourth area, smooth and rust-free, was surfactant cleaned.

The coating compositions were prepared by combining 2.5 parts of zinc dust with 1 part of vehicle, and mixing for 5 minutes on a RED DEVIL® Paint Shaker. All of the test panels and strips for one paint sample were coated at one time, by air pressure pot spraying.

Several ingredients are common to all of the coating compositions of the Examples and these include:

| Methyltriethanolammonium Silicate Solution | |
|---|---|
| mole ratio $SiO_2/NR_4$ | 12.5 |
| $SiO_2$ (% by weight) | 44.0 |
| Total titratable alkali as $NR_4$ (%) | 9.63 |
| Sodium Silicate Solution | |
| $SiO_2$ (%) | 8.9 |
| $Na_2O$ (%) | 28.7 |
| Hydrated Magnesium Silicate | |
| BENAQUA® - organically modified; modified magnesium montmorillonite | |
| BENAQUA® - is a registered trademark of NL Industries. | |

VEHICLE #1

This vehicle was prepared according to the prior art process of U.S. Pat. No. 3,453,122. The BENAQUA (0.6 pbw) was dispersed in 47.7 pbw of deionized water. The methyltriethanolammonium silicate (34.4 pbw) and sodium silicate (17.3 pbw) were combined. The vehicle contained 20.2% $SiO_2$ and 2.11% total titratable alkali calculated as $Na_2O$. The pH was 11.3 and the viscosity 463 cps, measured with a Brookfield RVT viscometer, #2 spindle at 20 rpm, and 20° C.

VEHICLE #2

This vehicle included the organosilicone-silicate polymer as required by the invention and the improved coating performance was realized. The Benaqua (0.6 pbw) was dispersed in 47.2 pbw of deionized water. Then 0.5 pbw of an organosilicone-silicate polymer was added and mixed to the thickened water. The polymer was prepared as described in Example 1 of U.S. Pat. No. 3,198,820 and consisted of $KOOCCH_2CH_2SiO_{1.5}$ and $(KO)_2SiO$ groups. The methyltriethanolammonium silicate and alkali metal silicate were combined as described in the preparation of Vehicle #1. The vehicle contained 20.3% SiO and 2.09% total titratable alkali as $Na_2O$. The pH was 11.4 and the viscosity 447 cps.

VEHICLE #3

The vehicle also represents an embodiment of the invention. The Benaqua (0.6 pbw) was dispersed in 47.6 pbw of deionized water, then 0.1 pbw of B-2083-78, a carboxy functional siliconate from Dow, was added to the thickened water. The remainder of the vehicle was prepared as described for Vehicle #1.

VEHICLES #4 AND #5

These vehicles also represent embodiments of the invention and contained 0.5 pbw and 1.0 pbw of the B-2083-78 siliconate, respectively. The siliconate content of these vehicles is summarized as follows:

| Vehicle No. | 1 | 2 | 3 | 4 | 5 |
|---|---|---|---|---|---|
| Siliconate (% by wt.) | 0 | 0.5 | 0.1 | 0.5 | 1.0 |

These vehicles were combined with 2.5 pbw of zinc per part of vehicle as described previously in the Examples and the various panels painted. The coated panels were subjected to the various tests. The results were as follows:

| | VEHICLE #1 | VEHICLE #4 |
|---|---|---|
| HOFFMAN SCRATCH (wt. in grams) | | |
| Rust | 1200 | 1500 |
| Oil | 700 | 900 |
| Clean | 500 | 1000 |
| Grit Blast | 2000 | 2000+ |
| KNIFE SCRATCH | | |
| Rust | e, f | f, g |
| Oil | c, c | c, d |
| Clean | d, d | e, d |
| Grit Blast | h, h | h, h+ |
| PENCIL SCRATCH | | |
| Rust | 2H | 9H+ |
| Oil | H | H |
| Clean | H | 6H |
| Grit Blast | 9H+ | 9H+ |
| TENSILE (psi) | | |
| Rusted Clean*Surface | 76(3)** | 123(2) |
| Rust Over Mill Scale | 11(4) | 245(2) |
| Oiled Clean*Surface | — | 208(5) |
| Oil Over Mill Scale | — | 202(5) |
| Oil-Free Mill Scale | 5(3) | 134(2) |
| Grit Blasted Surface | 143(4) | 324(2) |
| KNIFE SCRATCH | | |
| Rusted Clean*Surface | e | g |
| Rust Over Mill Scale | d | g |
| Oiled Clean*Surface | c | b |
| Oil Over Mill Scale | a | b |
| Oil-Free Mill Scale | e | e |
| Grit Blasted Surface | h | h |

*Test strips were power-wheel wire brushed to remove mill scale
**Curing time in days These results show that Vehicle #4 which is an embodiment of our invention provides coatings which have both improved adhesion and hardness when compared to Vehicle #1, the prior art coating.

The coating compositions prepared using Vehicles 1, 3, 4 and 5 were painted on Q-Panels and subjected to the Hoffman Scratch Test as the coating aged. The results are as follows:

| HOFFMAN SCRATCH TEST (wt. in grams) | | | | | | |
|---|---|---|---|---|---|---|
| Time (Days) | 1 | 10 | 20 | 50 | 70 | 90 |
| Vehicle #1 | 800 | 890 | 890 | 890 | 890 | 890 |
| Vehicle #3 | 1000 | 1190 | 1210 | 1250 | 1290 | 1400 |
| Vehicle #4 | 1200 | 1490 | 1500 | 1150 | 1580 | 1600 |

| HOFFMAN SCRATCH TEST (wt. in grams) | | | | | | |
|---|---|---|---|---|---|---|
| Time (Days) | 1 | 10 | 20 | 50 | 70 | 90 |
| Vehicle #5 | 1000 | 1100 | 1130 | — | — | — |

These results also clearly demonstrate the advantage of the coatings formulated according to our invention over those of the prior art.

We claim:

1. In the aqueous vehicle suitable for forming zinc rich coatings comprising a soluble quaternary ammonium silicate containing 1 to 4 alkanol groups, alkali metal silicate, a thickening agent compatible with aqueous alkaline systems and water; the improvement consisting of an organosilicone-silicate polymer which consists of 10 to 90% of a siloxane group and 10 to 90% of an alkali metal silicate group having the general formula of:

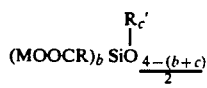

M represents sodium or potassium, R stands for a divalent hydrocarbon, R' represents a monovalent hydrocarbon group; b has a value of 1 to 3; c has a value of 0 to 2 and (b+c) has a value of 1 to 3.

2. The aqueous vehicle of claim 1 wherein there is 30 to 45 parts by weight of organic ammonium silicate selected from the group consisting of tetraethanolammonium silicate, methyltriethanolammonium silicate, dimethyldiethanolammonium silicate, trimethylethanolammonium silicate, ethyltriethanolammonium silicate, diethyldiethanolammonium silicate, n-propyltriethanolammonium silicate, isopropyltriethanolammonium silicate and benzyltriethanolammonium silicate; said organic ammonium silicate containing between 5 and 22.5 moles of $SiO_2$ per mole of quaternary ion and 25 to 55% solids; 10 to 25 parts by weight of sodium silicate with 1.5 to 4.0 moles of $SiO_2$ per mole of $Na_2O$ and 30 to 50% silicate solids; 0.2 to 2.5 parts by weight of the thickening agent; 0.05 to 3.5 pbw of the organosilicone-silicate polymer, and 40 to 55 pbw of water.

3. The vehicle of claim 2 wherein the quaternary ammonium silicate is methyltriethanolammonium silicate and has 7 to 15 moles of $SiO_2$ per mole of quaternary ion.

4. The vehicle of claims 1 or 2 wherein the vehicle contains 0.05 to 2.5 pbw of said organosilicone-silicate polymer.

5. The vehicle of claim 4 wherein the organosilicone-silicate polymer has the formula:

Z represents sodium or potassium, R and R' are the same or different hydrocarbon groups and n has a value between 2 and 20.

6. An aqueous vehicle suitable for forming zinc rich coatings, consisting essentially of:
   (a) 30 to 45 parts by weight of an organic ammonium silicate selected from the group consisting of tetraethanolammonium silicate, methyltriethanolammonium silicate, dimethyldiethanolammonium silicate, diethyldiethanolammonium silicate, n-propyltriethanolammonium silicate, isopropyltriethanolammonium silicate and benzyltriethanolammonium silicate; said organic ammonium silicate containing between 5 and 22.5 moles of $SiO_2$ per mole of quaternary ion and 25 to 55% solids;
   (b) 10 to 25 parts by weight of sodium silicate silicate solution with 1.5 to 4.0 moles of $SiO_2$ per mole of $Na_2O$ and 30 to 50% silicate solids;
   (c) 0.2 to 2.5 parts by weight of a thickening agent compatible with alkaline systems; and
   (d) 0.05 to 2.5 parts by weight of an organosilicone silicate polymer which consists of 10 to 90% of a siloxane group and 10 to 90% of an alkali metal silicate said siloxane group having the general formula of:

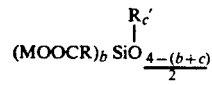

M represents sodium or potassium, R stands for a divalent hydrocarbon, R' a monovalent hydrocarbon group; b has a value of 1 to 3; c has a value of 0 to 2 and (b+c) has a value of 1 to 3.

7. The vehicle of claim 6 wherein the quaternary ammonium silicate is methyltriethanolammonium silicate and has 7 to 15 moles of $SiO_2$ per mole of quaternary ion.

8. The vehicle of either of claims 6 or 7 wherein the organosilicone-silicate polymer has the formula:

Z represents sodium or potassium, R and R' are the same or different hydrocarbon groups and n has a value between 2 and 20.

* * * * *